(12) United States Patent
Lee et al.

(10) Patent No.: US 11,099,414 B2
(45) Date of Patent: Aug. 24, 2021

(54) METHOD FOR MANUFACTURING CURVED DISPLAY PANEL, AND CURVED DISPLAY PANEL MANUFACTURED BY SAME MANUFACTURING METHOD

(71) Applicant: TOVIS CO., LTD., Incheon (KR)

(72) Inventors: Kyung Ha Lee, Changwon-si (KR); Yong Beom Kim, Incheon (KR); In Suk Lee, Seoul (KR)

(73) Assignee: TOVIS CO., LTD., Incheon (KR)

( * ) Notice: Subject to any disclaimer, the term of this patent is extended or adjusted under 35 U.S.C. 154(b) by 470 days.

(21) Appl. No.: 16/090,274

(22) PCT Filed: Feb. 17, 2017

(86) PCT No.: PCT/KR2017/001768
§ 371 (c)(1),
(2) Date: Oct. 1, 2018

(87) PCT Pub. No.: WO2017/171236
PCT Pub. Date: Oct. 5, 2017

(65) Prior Publication Data
US 2019/0113795 A1    Apr. 18, 2019

(30) Foreign Application Priority Data
Apr. 1, 2016 (KR) .................. 10-2016-0039995

(51) Int. Cl.
*G02F 1/13* (2006.01)
*G02F 1/1333* (2006.01)
(Continued)

(52) U.S. Cl.
CPC ........ *G02F 1/133305* (2013.01); *B32B 37/12* (2013.01); *G02F 1/0136* (2013.01);
(Continued)

(58) Field of Classification Search
CPC ............... B32B 37/12; G02F 1/1333
(Continued)

(56) References Cited

U.S. PATENT DOCUMENTS

| | | | |
|---|---|---|---|
| 2012/0320509 A1* | 12/2012 | Kim | B32B 17/10 361/679.01 |
| 2014/0226112 A1 | 8/2014 | Kim | |
| 2015/0301390 A1* | 10/2015 | Kim | G02F 1/133305 29/825 |

FOREIGN PATENT DOCUMENTS

| | | |
|---|---|---|
| JP | 2008-009356 A | 1/2008 |
| KR | 10-2010-0025219 A | 3/2010 |

(Continued)

OTHER PUBLICATIONS

International Search Report for PCT/KR2017/001768 dated May 19, 2017 from Korean Intellectual Property Office.

*Primary Examiner* — Peter Dungba Vo
*Assistant Examiner* — Azm A Parvez
(74) *Attorney, Agent, or Firm* — Revolution IP, PLLC (57) ABSTRACT

A method of manufacturing a curved display panel, includes: polishing a portion of the flat display panel that is to form a protrusion, which protrudes in order to protect a portion, to which a drive circuit board is attached, through mechanical polishing so as to have a preset thickness; installing a sealing member, which protects the flat display panel, polished in the polishing, from an etchant by surrounding both the portion that is to form the protrusion and the drive circuit board; and etching an entirety of both surfaces of the flat display panel using the etchant, excluding a portion on which the sealing member is provided, so that the flat display panel, having the sealing member installed in the installing, has a thickness smaller than a thickness of the protrusion.

10 Claims, 5 Drawing Sheets

(51) Int. Cl.
   *G09F 9/00* (2006.01)
   *B32B 37/12* (2006.01)
   *G02F 1/01* (2006.01)
   *G02F 1/1335* (2006.01)
   *G02F 1/1345* (2006.01)
   *G02F 1/1339* (2006.01)

(52) U.S. Cl.
   CPC ...... *G02F 1/1333* (2013.01); *G02F 1/133528* (2013.01); *G09F 9/00* (2013.01); *G02F 1/1339* (2013.01); *G02F 1/13452* (2013.01); *G02F 2201/50* (2013.01)

(58) Field of Classification Search
   USPC ........................................ 29/829, 825, 592.1
   See application file for complete search history.

(56) References Cited

FOREIGN PATENT DOCUMENTS

| KR | 10-2013-0026285 A | 3/2013 |
| KR | 10-2014-0037422 A | 3/2014 |
| KR | 10-1478823 B1 | 1/2015 |
| KR | 10-2015-0083448 A | 7/2015 |

* cited by examiner

METHOD FOR MANUFACTURING CURVED DISPLAY PANEL, AND CURVED DISPLAY PANEL MANUFACTURED BY SAME MANUFACTURING METHOD

TECHNICAL FIELD

The present invention relates to a method of manufacturing a curved display panel to enable the manufacture of the curved display panel by reducing the thickness of a previously manufactured display panel, and a curved display panel manufactured by the manufacturing method.

BACKGROUND ART

In general, a display device is a device that displays an image. In recent years, a curved display device, which is bent to have a curved shape in order for a viewer to feel a greater sense of immersion in the image displayed on the screen, has been disclosed.

Such a curved display device is manufactured by attaching a curved-shape-holding member, which is capable of maintaining a curved shape, to a display panel, or by introducing a display panel into a curved case, in order to keep the display panel bent in a curved shape.

Meanwhile, since a general display panel, used for the manufacture of a curved display device, may be easily broken when it is bent, it is necessary for the display panel to be manufactured to a minimum thickness.

A method of manufacturing a display panel for the manufacture of a curved display device is disclosed in Korean Patent Laid-Open Publication No. 10-2015-0083448 entitled "METHOD OF MANUFACTURING CURVED DISPLAY".

In the disclosed method for the manufacture of a curved display device, both surfaces of a display panel are etched using an etchant so that the display panel has a small thickness, whereby a curved display that may be easily bent may be manufactured.

Meanwhile, a protrusion, which is not etched, is formed on a rim portion of the etched display panel in order to increase the rigidity of the display panel or to protect a drive circuit when the display panel is bent to have a curved shape. In the case in which the protrusion is initially formed and not etched, however, it is difficult to manufacture a slim curved display panel due to the thickness of the protrusion.

In order to address this problem, in the related art, when etching is performed in order to reduce the thickness of a display panel, the entire display panel including a portion that is to form a protrusion is primarily etched using an etchant so that the thickness thereof is reduced, and thereafter, the display panel excluding the portion that is to form the protrusion is secondarily etched using the etchant so that the thickness thereof is reduced. This may achieve a reduction in the height of the protrusion.

However, the etching method of the related art may increase the defect rate of the manufactured curved display panel due to the infiltration of the etchant since the thickness of the display panel is reduced by performing etching twice in order to achieve a reduction in the thickness of the protrusion.

In addition, since only the portion that is to form the protrusion is etched by the etchant during etching, a seal disposed adjacent to the protrusion is not changed in thickness, which causes inconvenience in the manufacture of the display panel since it is necessary to reinstall a seal having a thickness suited to the reduced thickness of the protrusion.

DISCLOSURE

Technical Problem

Therefore, the present invention has been made in view of the above problems, and it is an object of the present invention to provide a method of manufacturing a curved display panel, which is capable of reducing the defect rate of the display panel due to the infiltration of an etchant by maximally preventing the display panel from being exposed to the etchant when the etchant is used to reduce the thickness of a protrusion and which is also capable of making it unnecessary to reinstall a seal member, thus eliminating any inconvenience in manufacture, and a curved display panel manufactured by the manufacturing method.

Technical Solution

In accordance with an aspect of the present invention, the above and other objects can be accomplished by the provision of a method of manufacturing a curved display panel to enable manufacture of the curved display panel by reducing a thickness of a previously manufactured flat display panel, the method including polishing a portion of the flat display panel that is to form a protrusion, which protrudes in order to protect a portion, to which a drive circuit board is attached, through mechanical polishing so as to have a preset thickness, installing a sealing member, which protects the flat display panel, polished in the polishing, from an etchant by surrounding both the portion that is to form the protrusion and the drive circuit board, and etching an entirety of both surfaces of the flat display panel using the etchant, excluding a portion on which the sealing member is provided, so that the flat display panel, having the sealing member installed in the installing, has a thickness smaller than a thickness of the protrusion.

The method may further include, before the polishing, removing a film attached to the flat display panel.

The film may be a protective film for protecting the flat display panel, or a polarizer film.

In the removing, the film may be removed only from the portion that is to form the protrusion, in order to protect the flat display panel from a foreign substance generated by mechanical polishing in the polishing.

Before the polishing, a protective film may be attached to a remaining portion of the flat display panel, excluding the portion that is to form the protrusion, in order to protect the flat display panel from a foreign substance generated by mechanical polishing in the polishing.

In the polishing, a seal attached to a rim portion, to which the drive circuit board is attached, and the portion that is to form the protrusion may be mechanically polished together so that the seal has the same height as the protrusion.

In the installing, the sealing member may be installed so as to cover the portion that is to form the protrusion on one surface of the flat display panel and the portion that is to form the protrusion on a remaining surface of the flat display panel and pass over the drive circuit board.

In the installing, the sealing member may be formed to have an envelope shape having an open lower end and is installed to cover and accommodate the drive circuit board therein so as to cover the portion that is to form the protrusion.

In the installing, the sealing member may be an acid-resistant adhesive tape, and the sealing member may be wound and attached in a manner such that respective elements thereof overlap each other like roof shingles in order to allow the etchant to flow down in a state in which the drive circuit board is positioned on an upper portion.

The installing may include masking the portion that is to form the protrusion using a masking tape, before the sealing member is installed.

The sealing member may include an acid-resistant adhesive tape provided on an end thereof to attach the sealing member to the portion that is to form the protrusion.

The method may further include, between the polishing and the installing, applying an adhesive for again attaching a portion, from which the seal is separated due to mechanical polishing, to the portion that is to form the protrusion.

In accordance with another aspect of the present invention, there is provided a curved display panel manufactured by the method of manufacturing the curved display panel.

Advantageous Effects

According to the present invention, prior to performing etching in order to reduce the thickness of a display panel, a protrusion is reduced in thickness through mechanical polishing, so as to maximally prevent the display panel from being exposed to an etchant. Thereby, it is possible to minimize the defect rate of the display panel due to the infiltration of the etchant.

In addition, a seal, which is disposed adjacent to the protrusion, is reduced in thickness together with the protrusion through mechanical polishing. Thereby, it is possible to eliminate inconvenience caused by the reinstallation of the seal.

DESCRIPTION OF REFERENCE NUMERALS

100: curved display panel
110: first substrate
120: second substrate
130: liquid crystal layer
140: film
150: protrusion
170: seal
190: drive circuit board
200: sealing member
210: adhesive tape
230: masking member
300: grinder wheel

MODE FOR INVENTION

Hereinafter, a method of manufacturing a curved display panel 100 according to an embodiment of the present invention will be described with reference to the accompanying drawings.

First, the present invention relates to a method of manufacturing the curved display panel 100, which enables the manufacture of the curved display panel 100 by processing a previously manufactured flat display panel, which is a ready-made article, to have a small thickness so as to allow the display panel to bend in a curved form.

Figure 2:
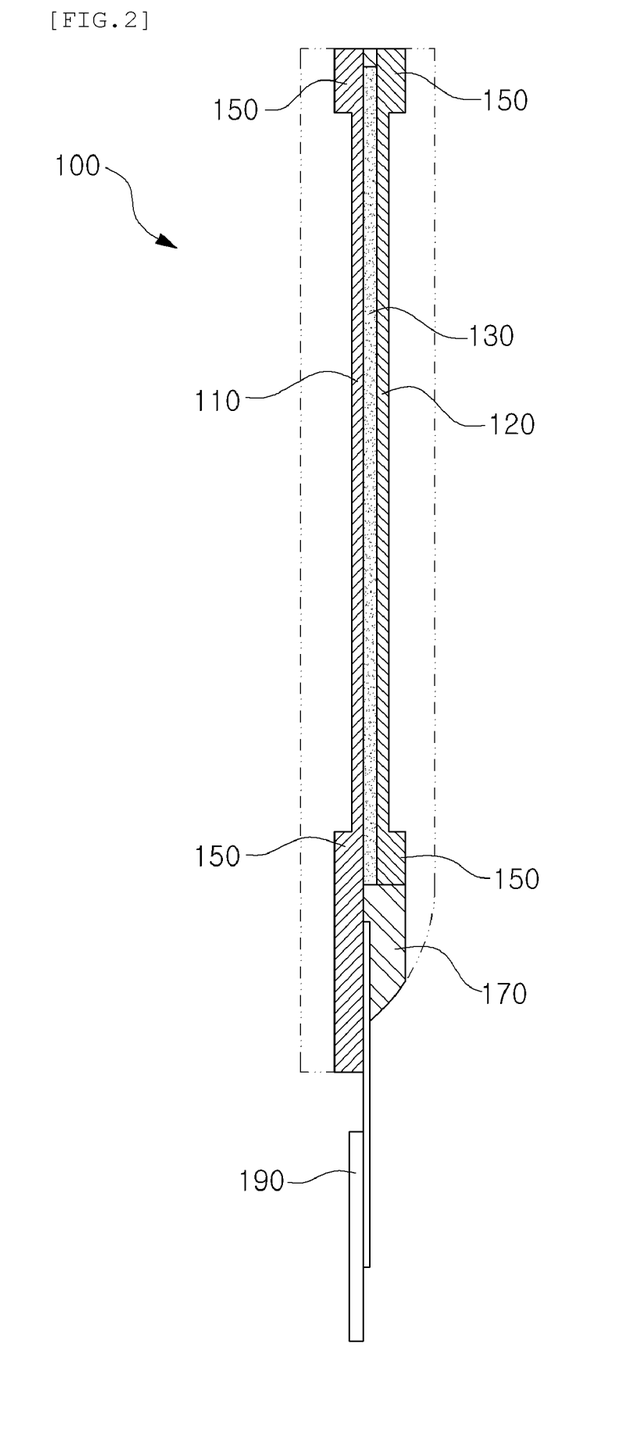
FIG. 2 is a side view schematically illustrating a curved display panel manufactured by the method of manufacturing the curved display panel according to the first embodiment of the present invention.

As illustrated in FIG. 2, the curved display panel 100, which is manufactured by the method of manufacturing the curved display panel 100 according to the embodiment of the present invention, may be manufactured by processing a previously manufactured flat display panel. In the embodiment, the previously manufactured flat display panel will be described as being an LCD panel, but may be an OLED panel.

Here, when the flat display panel is an LCD panel, the display panel may include a first substrate 110, a second substrate 120, a liquid crystal layer 130 inserted between the first substrate 110 and the second substrate 120, and a seal 170 may be provided around the first substrate 110 and the second substrate 120 in order to prevent the leakage of the liquid crystal layer 130.

In this case, when the first substrate 110 is a thin film transistor substrate, the second substrate 120 may be a color filter substrate.

Figure 1:
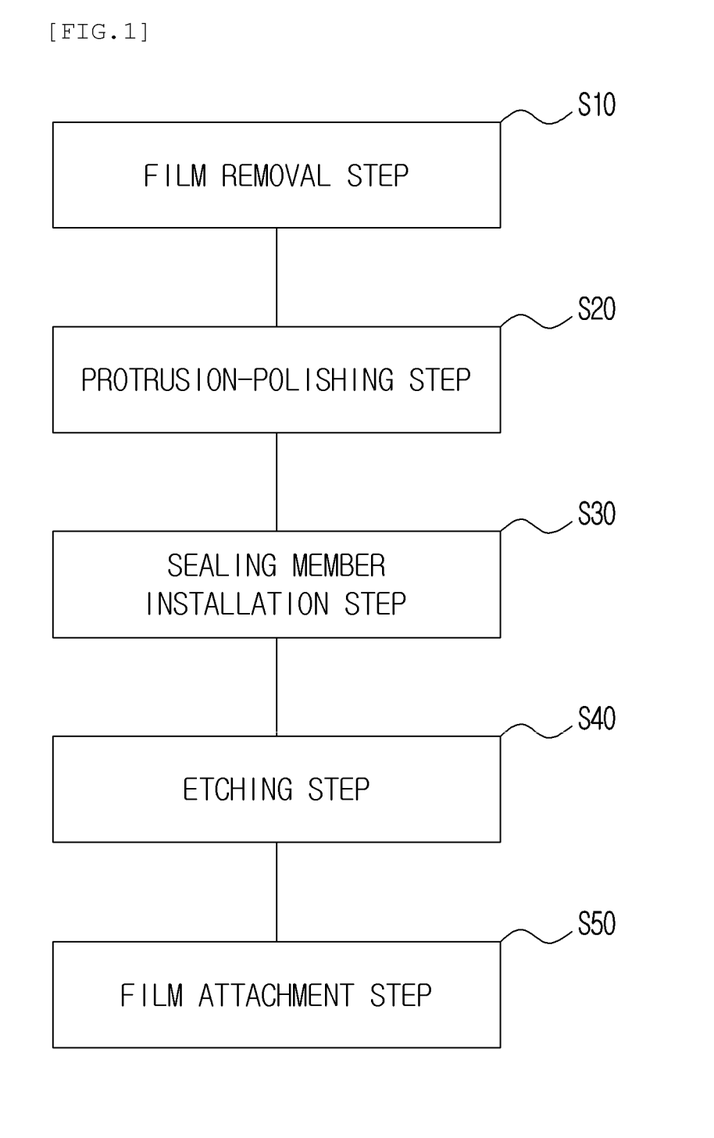
FIG. 1 is a flowchart schematically illustrating a method of manufacturing a curved display panel according to a first embodiment of the present invention.

As illustrated in FIG. 1, the method of manufacturing the curved display panel 100 according to the first embodiment of the present invention may include a film removal step (S10).

In the film removal step S10, a film 140, which has been previously attached, may be removed in order to prepare for the processing of a previously manufactured flat display panel.

The film 140 to be removed in the film removal step S10 may be a protective film, which has been previously attached in order to protect the surface of the flat display panel at the time of delivery of the flat display panel, or may be a polarizer film, which performs a polarization function when the flat display panel is an LCD.

Figure 3:
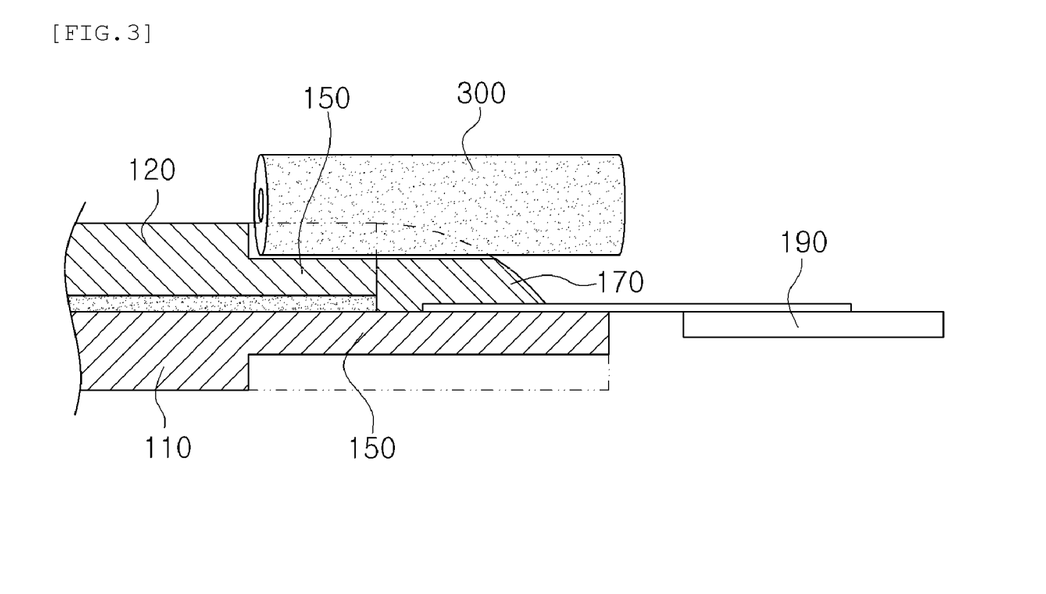
FIG. 3 is a view schematically illustrating a protrusion-polishing step in the method of manufacturing the curved display panel according to the first embodiment of the present invention, in which only a portion, to which a drive circuit board is attached, is illustrated.

As illustrated in FIGS. 1 and 3, the method of manufacturing the curved display panel 100 according to the first embodiment of the present invention may include a protrusion-polishing step (S20).

The protrusion-polishing step S20 may be a step of polishing a protrusion 150, which protrudes from a rim portion of the flat display panel in order to impart rigidity to the finally manufactured curved display panel 100 during bending of the display panel 100.

In the protrusion-polishing step S20, the portion of the display panel that is to form the protrusion 150 is subjected to mechanical polishing so as to have a preset thickness. Thereby, the thickness of the portion that is to form the protrusion may be reduced.

The protrusion-polishing step S20 may be a step of polishing the portion that is to form the protrusion 150 in advance so that the thickness thereof is reduced, in order to minimize the thickness of the protrusion 150, which protrudes from the finally manufactured curved display panel 100.

Here, when the thickness of the protrusion 150 is reduced through etching using an etchant, the etchant may penetrate a portion, to which a drive circuit board 190 is attached, thus causing defects in the curved display panel 100. Therefore, in the present invention, the thickness of the portion that is to form the protrusion 150 is reduced through mechanical polishing.

The mechanical polishing may be performed by rotating a grinder wheel 300, which takes the form of a circular roll, so as to move the grinder wheel along a rim portion that is to form the protrusion 150. When the seal 170, which is responsible for airtight sealing of the flat display panel, is attached to the portion that is to form the protrusion 150, the seal 170 may be polished together with the protrusion 150 so as to have the same height as that of the protrusion 150.

In the first embodiment, both surfaces of a rim portion, to which the drive circuit board 190 is attached, and both surfaces of an opposite rim portion of the flat display panel are used as the portion that is to form the protrusion 150. However, as needed, the protrusion 150 may be formed on both surfaces or one surface of the entire rim portion of the flat display panel, or on both surfaces or one surface of a portion of the rim portion (here, "both surfaces" means the outer surface of the first substrate 110 and the outer surface of the second substrate 120 and "one surface" means the outer surface of the first substrate 110 or the outer surface of the second substrate 120).

Then, in the portion that is to form the protrusion 150, the seal 170 may be positioned on a boundary portion of the color filter substrate, to which the drive circuit board 190 is attached, and the seal 170 may be mechanically polished so as to be reduced in thickness to have the same thickness as the protrusion 150.

Here, since the seal 170 is resistant to etching using an etchant, when the protrusion 150 is etched using an etchant, the thickness of the seal 170 is not reduced, so that the seal 170 protrudes further than the protrusion 150. This makes it necessary to reinstall the seal 170. On the other hand, in the present invention, both the protrusion 150 and the seal 170 are reduced in thickness by mechanical polishing, which may eliminate inconvenience due to the reinstallation of the seal 170.

The method of manufacturing the curved display panel 100 according to the first embodiment of the present invention may include an adhesive application step (not illustrated).

The adhesive application step may be a step of applying an adhesive for the attachment of a portion, from which the seal 170 is separated by the grinder wheel when the seal 170 and the portion that is to form the protrusion 150 are mechanically polished.

The adhesive application step may be performed by applying the adhesive around the periphery of the seal 170, and the adhesive may be the same material as the seal 170, or may be a curable resin that is solidified in a liquid phase.

Figure 4:
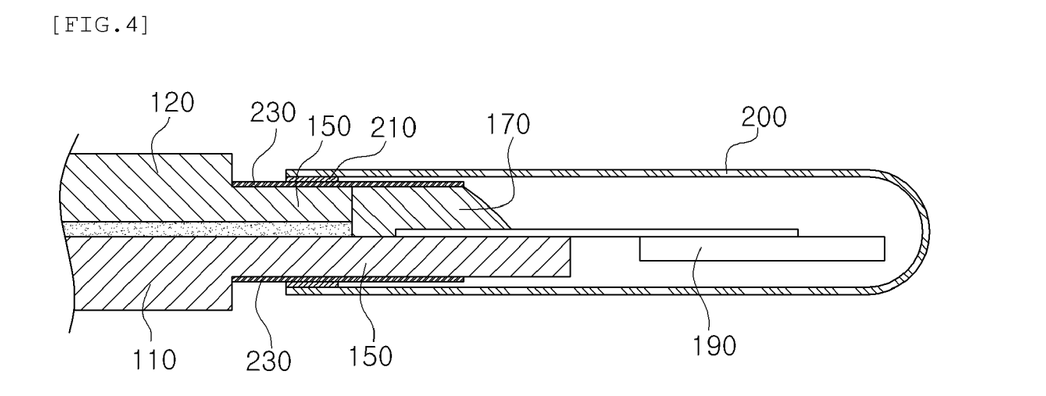
FIG. 4 is a view schematically illustrating a sealing member installation step in the method of manufacturing the curved display panel according to the first embodiment of the present invention, in which only the portion, to which the drive circuit board is attached, is illustrated.
Figure 5:
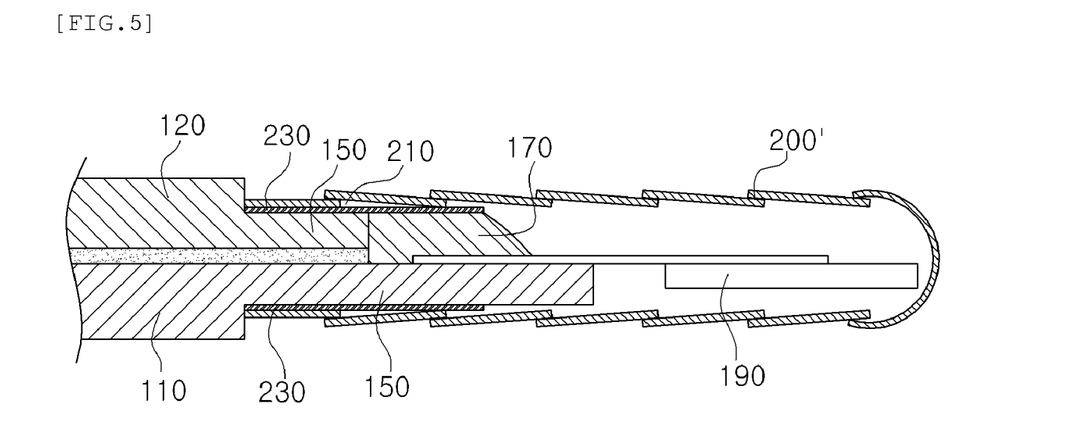
FIG. 5 is a view schematically illustrating the sealing member installation step in the method of manufacturing the curved display panel according to the first embodiment of the present invention, in which a modification of a sealing member is illustrated.

As illustrated in FIGS. 1, 4 and 5, the method of manufacturing the curved display panel 100 according to the first embodiment of the present invention may include a sealing member installation step S30.

The sealing member installation step S30 may be a step of installing a sealing member 200 in order to prevent the portion that is to form the protrusion 150 and the drive circuit board 190, which is used to drive the flat display panel, from being etched by an etchant during etching using the etchant, which will be described below.

The sealing member installation step S30 may include a masking step.

In the masking step, a masking member 230 having acid resistance may be attached in advance to the portion that is to form the protrusion 150 so as to prevent the protrusion 150 from being etched by the etchant.

Here, the masking member 230 may be formed a piece of acid-resistant adhesive tape.

The sealing member 200 may be installed after the portion that is to form the protrusion 150 is subjected to masking using the masking member 230, but the sealing member 200 may be provided directly on the portion that is to form the protrusion 150 as needed, without performing the masking step, so that the sealing member 200 also performs a masking function.

The sealing member 200 may be formed to have an envelope shape having one open end and may be installed on the portion that is to form the protrusion 150 so as to cover the protrusion 150. Alternatively, the sealing member 200 may be formed to have a film shape and may be installed in a manner such that it is attached from the portion that is to form the protrusion 150 on one surface of the flat display panel to the portion that is to form the protrusion 150 on the other surface of the flat display panel and passes over the rim portion.

At this time, when the drive circuit board 190 is attached to the rim portion, to which the sealing member 200 is to be provided, the drive circuit board 190 may also be covered with the sealing member, or both the drive circuit board 190 and the sealing member may pass over and be attached to the rim portion.

Then, an acid-resistant adhesive tape 210 may be provided on the rim portion of the sealing member 200 so that the sealing member 200 may be easily attached to the outer surface of the flat display panel. In the case in which the sealing member 200 takes the form of a film and passes over and is attached to the rim portion, opposite ends of the sealing member may be attached by the acid-resistant adhesive tape 210, or may be attached by thermal fusion, in order to prevent the infiltration of the etchant.

Alternatively, as illustrated in FIG. 5, a sealing member 200' may be formed of only the acid-resistant adhesive tape 210 and may be installed so as to be wound around and attached to both surfaces of the portion that is to form the protrusion 150 in the longitudinal direction of the protrusion 150. At this time, the sealing member 200' may be wound and attached so as to further cover the drive circuit board 190. The sealing member 200' may be attached in a manner such that peripheral ends of respective elements thereof partially overlap each other, like roof shingles, in order to facilitate the flow of the etchant.

Figure 6:
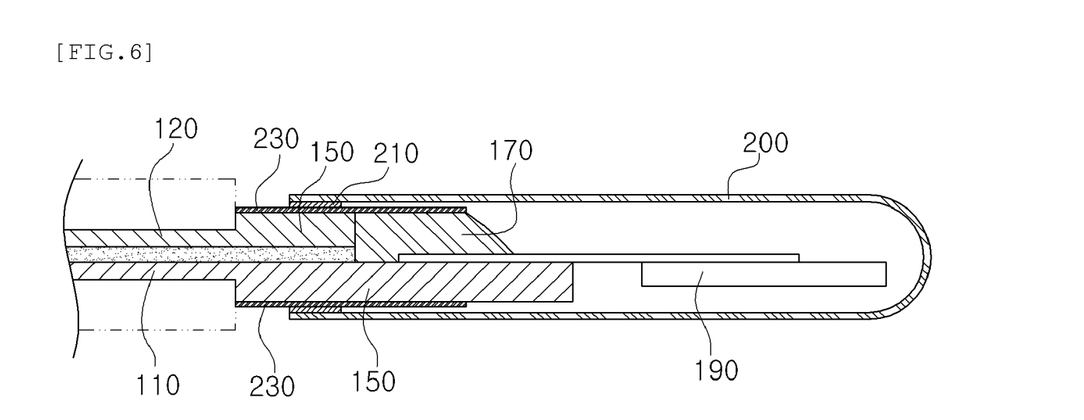
FIG. 6 is a view schematically illustrating an etching step in the method of manufacturing the curved display panel according to the first embodiment of the present invention, in which only the portion, to which the drive circuit board is attached, is illustrated.

As illustrated in FIGS. 1 and 6, the method of manufacturing the curved display panel according to the first embodiment of the present invention may include an etching step S40.

In the etching step S40, etching may be performed using an etchant on the flat display panel, having the sealing member 200 provided in the sealing member installation step S30, so that the thickness of the entire display panel, excluding the portion on which the sealing member 200 is provided, is reduced.

The etching step S40 may be performed by spraying the etchant to both surfaces of the flat display panel or by applying the etchant so that the etchant flows down from the top.

At this time, in order to maximally prevent the etchant from penetrating into the drive circuit board 190, the etchant may flow down or be sprayed in the state in which the drive circuit board 190 is positioned on the upper portion of the flat display panel.

Then, in the etching step S40, the display panel may be etched using the etchant so as to be thinner than the protrusion 150, which has been polished through mechanical polishing, so that the protrusion 150 protrudes from the surface of the flat display panel, the entirety of which is polished.

After the etching is performed using the etchant in the etching step S40, a cleaning step may be performed to remove the applied etchant.

The method of manufacturing the curved display panel 100 according to the first embodiment of the present invention may include a sealing member removal step (not illustrated).

The sealing member removal step may be a step of removing the sealing member 200 from the flat display panel, the thickness of which is reduced in the entirety thereof after the completion of the etching. In the case in which the masking has been performed, the masking member 230 may also be removed when the sealing member 200 is removed.

Here, the sealing member 200 is the sealing member 200 installed in the sealing member installation step S30.

The method of manufacturing the curved display panel 100 according to the first embodiment of the present invention may include a film attachment step (S50).

The film attachment step S50 may attach the film 140, which was initially removed, to the curved display panel 100.

In this case, when the flat display panel is an LCD panel, the film 140 may be a polarizer film 140. The polarizer film 140 may be the film that was initially removed and again attached, or may be a new polarizer film.

In addition, the film 140 may be a protective film 140 for protecting the surface of the curved display panel 100.

In addition, as needed, the manufacture of the curved display panel 100 may be completed without performing the film attachment step (S50), or the manufacture of the curved display panel 100 may be completed after the film attachment step (S50).

The curved display panel 100 manufactured in this manner may be attached to a curved-shape-holding member, which is capable of maintaining a curved shape, or may be introduced into a curved case, so that a curved display device, which is bent in a curved shape, may be manufactured.

Accordingly, since the curved display panel 100, manufactured by the method of manufacturing the curved display panel 100 according to the embodiment of the present invention, does not require repetitive etching in order to minimize the thickness of the protrusion 150, it is possible not only to prevent defects in the curved display panel 100 due to the etchant but also to minimize the thickness of the protrusion 150, thereby enabling the manufacture of a slim curved display device.

In addition, when reducing the thickness of the protrusion 150 through mechanical polishing, the thickness of the seal 170, which is not etched by the etchant, is also reduced. Thereby, it is possible to eliminate inconvenience due to the reinstallation of the seal 170.

Hereinafter, the method of manufacturing the curved display panel 100 according to a second embodiment of the present invention will be described. In the description related to the method of manufacturing the curved display panel 100 according to the second embodiment of the present invention, the same reference numerals will be given to the same components as those in the first embodiment, and the same components have the same functions and effects, and thus, a detailed description thereof will be omitted.

Figure 7:
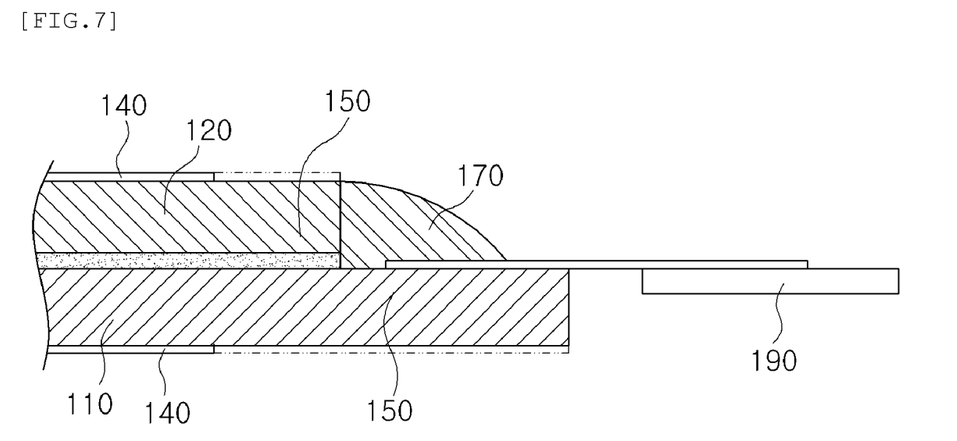
FIG. 7 is a view schematically illustrating a film removal step in the method of manufacturing the curved display panel according to a second embodiment of the present invention, in which only the portion, to which the drive circuit board is attached, is illustrated.

As illustrated in FIG. 7, the method of manufacturing the curved display panel 100 according to the second embodiment of the present invention may include the film removal step (S10).

In this film removal step S10, the film 140, which is attached to the flat display panel as a ready-made article, is not entirely removed, but may be removed from only the portion of the flat display panel that is to form the protrusion 150.

When the film 140 is removed only from the portion that is to form the protrusion 150, the remaining portion other than the portion that is to form the protrusion 150 is protected by the film 140. This may prevent contamination due to foreign substances, the occurrence of scratches, or the like caused when reducing the thickness of the portion that is to form the protrusion 150 through mechanical polishing.

At this time, the film 140 may be a polarizer film or a protective film attached to a previously manufactured flat display panel.

In the case where the film 140 is not attached to the previously manufactured flat display panel, the film 140 may be attached to the display panel excluding the portion that is to form the protrusion 150, or the film 140 may be attached to the entire surface of the display panel and thereafter be removed only from the portion that is to form the protrusion 150.

When the film 140 is removed from, for example, the portion that is to form the protrusion 150, for example, the protrusion-polishing step S20, the sealing member installation step S30, and the etching step S40 are sequentially performed in the same manner as in the first embodiment, whereby the manufacture of the curved display panel 100 is completed.

Accordingly, the method of manufacturing the curved display panel 100 according to the second embodiment may prevent defects caused when the surface of the flat display panel is contaminated by foreign substances while the portion that is to form the protrusion 150 is being mechanically polished.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims.

INDUSTRIAL APPLICABILITY

The present invention is applicable to various display industrial fields for the display of images such as game machines, computers, billboards, and the like.

The invention claimed is:

1. A method of manufacturing a curved display panel to enable manufacture of the curved display panel by reducing a thickness of a previously manufactured flat display panel, the method comprising:
   polishing a protrusion portion of the flat display panel that is to form a protrusion, which protrudes in order to protect a drive circuit portion, to which a drive circuit board is attached, through mechanical polishing so as to have a preset thickness;
   installing a sealing member which protects the flat display panel from an etchant by surrounding both the protrusion portion and the drive circuit board;
   etching an entirety of both surfaces of the flat display panel using the etchant, excluding a sealing portion on which the sealing member is provided, so that the flat display panel, having the sealing member installed in the installing, has a thickness smaller than a thickness of the protrusion; and
   before the polishing, removing a film attached to the flat display panel,
   wherein, in the removing, the film is removed only from the protrusion portion in order to protect the flat display panel from a foreign substance generated by mechanical polishing in the polishing.

2. The method according to claim 1, wherein the film is a protective film for protecting the flat display panel, or a polarizer film.

3. A method of manufacturing a curved display panel to enable manufacture of the curved display panel by reducing a thickness of a previously manufactured flat display panel, the method comprising:
   polishing a protrusion portion of the flat display panel that is to form a protrusion, which protrudes in order to protect a drive circuit portion, to which a drive circuit board is attached, through mechanical polishing so as to have a preset thickness;
   installing a sealing member which protects the flat display panel from an etchant by surrounding both the protrusion portion and the drive circuit board; and
   etching an entirety of both surfaces of the flat display panel using the etchant, excluding a sealing portion on which the sealing member is provided, so that the flat display panel, having the sealing member installed in the installing, has a thickness smaller than a thickness of the protrusion,
   wherein, before the polishing, a protective film is attached to the flat display panel except for the protrusion portion in order to protect the flat display panel from a foreign substance generated by mechanical polishing in the polishing.

4. A method of manufacturing a curved display panel to enable manufacture of the curved display panel by reducing a thickness of a previously manufactured flat display panel, the method comprising:
   polishing a protrusion portion of the flat display panel that is to form a protrusion, which protrudes in order to protect a drive circuit portion, to which a drive circuit board is attached, through mechanical polishing so as to have a preset thickness;
   installing a sealing member which protects the flat display panel from an etchant by surrounding both the protrusion portion and the drive circuit board; and
   etching an entirety of both surfaces of the flat display panel using the etchant, excluding a sealing portion on which the sealing member is provided, so that the flat display panel, having the sealing member installed in the installing, has a thickness smaller than a thickness of the protrusion,
   wherein, in the polishing, a seal attached to a rim portion of the drive circuit board is mechanically polished together with the protrusion portion so that the seal has the same height as the protrusion.

5. The method according to claim 1, wherein, in the installing, the sealing member is installed so as to cover the protrusion portion on one surface of the flat display panel and the protrusion portion on a remaining surface of the flat display panel and pass over the drive circuit board.

6. The method according to claim 1, wherein, in the installing, the sealing member is formed to have an envelope shape having an open lower end and is installed to cover and accommodate the drive circuit board therein so as to cover the portion that is to form the protrusion.

7. The method according to claim 1, wherein, in the installing, the sealing member is an acid-resistant adhesive tape, and the sealing member is wound and attached in a manner such that respective elements thereof overlap each other like roof shingles in order to allow the etchant to flow down in a state in which the drive circuit board is positioned on an upper portion.

8. The method according to claim 1, wherein the installing comprises masking the portion that is to form the protrusion using a masking tape, before the sealing member is installed.

9. The method according to claim 1, wherein the sealing member comprises an acid-resistant adhesive tape provided on an end thereof to attach the sealing member to the portion that is to form the protrusion.

10. A method of manufacturing a curved display panel to enable manufacture of the curved display panel by reducing a thickness of a previously manufactured flat display panel, the method comprising:
    polishing a protrusion portion of the flat display panel that is to form a protrusion, which protrudes in order to protect a drive circuit portion, to which a drive circuit board is attached, through mechanical polishing so as to have a preset thickness;
    installing a sealing member which protects the flat display panel from an etchant by surrounding both the protrusion portion and the drive circuit board;
    etching an entirety of both surfaces of the flat display panel using the etchant, excluding a sealing portion on which the sealing member is provided, so that the flat display panel, having the sealing member installed in the installing, has a thickness smaller than a thickness of the protrusion; and
    between the polishing and the installing, when a seal is attached to the protrusion portion, applying an adhesive to an area of the protrusion portion where the seal is separated due to mechanical polishing.

* * * * *